(12) United States Patent
Butts (10) Patent No.: US 11,745,136 B2
(45) Date of Patent: Sep. 5, 2023

(54) SYSTEM AND METHOD FOR TREATING A METHANE SYSTEM TO REMOVE CARBON DIOXIDE, HYDROGEN SULFIDE, AND WATER IN A SINGLE PROCESS

(71) Applicant: BCCK Holding Company, Midland, TX (US)

(72) Inventor: Rayburn C. Butts, Midland, TX (US)

(73) Assignee: BCCK Holding Company, Midland, TX (US)

( * ) Notice: Subject to any disclaimer, the term of this patent is extended or adjusted under 35 U.S.C. 154(b) by 129 days.

(21) Appl. No.: 17/070,674

(22) Filed: Oct. 14, 2020

(65) Prior Publication Data
US 2022/0111329 A1 Apr. 14, 2022

(51) Int. Cl.
*B01D 53/14* (2006.01)
*B01D 53/00* (2006.01)
*F25J 3/02* (2006.01)

(52) U.S. Cl.
CPC ....... *B01D 53/1406* (2013.01); *B01D 53/002* (2013.01); *B01D 53/1462* (2013.01); *B01D 53/1468* (2013.01); *B01D 53/1475* (2013.01); *F25J 3/0233* (2013.01)

(58) Field of Classification Search
None
See application file for complete search history.

(56) References Cited

U.S. PATENT DOCUMENTS

| 4,158,556 A * | 6/1979 | Yearout .................. F25J 3/0209 |
| | | 62/622 |
| 4,252,548 A * | 2/1981 | Markbreiter .............. C07C 7/11 |
| | | 62/929 |
| 4,770,676 A | 9/1988 | Sircar et al. |
| 4,784,672 A | 11/1988 | Sircar |
| 5,520,249 A | 5/1996 | Minkkinen et al. |

(Continued)

FOREIGN PATENT DOCUMENTS

WO WO2011053400 5/2011

OTHER PUBLICATIONS

LFG Energy Project Development Handbook; Mar. 2020.
(Continued)

*Primary Examiner* — Jonathan Miller
(74) *Attorney, Agent, or Firm* — Scheef & Stone, LLP; Robin L. Barnes (57) ABSTRACT

A system and method for simultaneously removing water and acid gases from methane in a single process without requiring dehydration prior to acid gas removal. A feed stream comprising these components and little or no hydrocarbons heavier than methane is separated in a series of separators, including an absorber column using methanol as an absorber. A treated methane stream comprising at least 90%, more preferably at least 95%, most preferably at least 99%, of the methane from the feed stream and an acid gas waste stream comprising less than 10%, more preferably less than 5%, most preferably less than 1%, of the methane from the feed stream are produced. Using methanol as a physical solvent allows removal of water and acids gases in a single step using substantially less energy than conventional separation methods. The system and method are particularly useful in treating landfill gas feed streams.

37 Claims, 2 Drawing Sheets

(56) References Cited

U.S. PATENT DOCUMENTS

| | | | |
|---|---|---|---|
| 5,727,903 | A | 3/1998 | Borray et al. |
| 6,711,914 | B2 | 3/2004 | Lecomte |
| 7,731,779 | B2 | 6/2010 | Palumbo |
| 7,883,569 | B2 | 2/2011 | Stinson |
| 8,480,789 | B2 | 7/2013 | Sorensen et al. |
| 9,023,131 | B2 | 5/2015 | Tremblay et al. |
| 9,028,682 | B2 * | 5/2015 | Butts ..................... C10L 3/103 210/167.04 |
| 2012/0264197 | A1 | 10/2012 | Mitariten |
| 2014/0275691 | A1 * | 9/2014 | Butts ..................... C07C 7/04 96/242 |
| 2016/0136567 | A1 | 5/2016 | Buccini et al. |

OTHER PUBLICATIONS

Processing Natural Gas; NaturalGas.org; http://naturalgas.org/naturalgas/processing-ng/#water; retrieved Aug. 3, 2020.

UOP Selexol Technology for Acid Gas Removal, 2009; downloaded from http://www.uop.com/?document=uop-selexol-technology-for-acid-gas-removal&download=1.

Dow article, New Hybrid Solvent Application at the Westcoast Gas Services, Inc. Jedney Gas Plant, Sterner, et al. 1998; downloaded from http://www.dow.com/gastreating/solution/ngp_hs.htm.

Uop LLC, Purification and Recovery Options for Gasification, D.I Kubek et al, 2000; downloaded from http://opac.tistr.or.th/Multimedia/Web/0049/wb0049947.pdf.

Bryan Research & Engineering, Inc., A Comparison of Physical Solvents for Acid Gas Removal; Jan. 2008; Burr et al.; downloaded from http://bre.com/PDF/A-Comparison-of-Physical-Solvents-For-Acid-Gas-Removal-REVISED.pdf.

* cited by examiner

SYSTEM AND METHOD FOR TREATING A METHANE SYSTEM TO REMOVE CARBON DIOXIDE, HYDROGEN SULFIDE, AND WATER IN A SINGLE PROCESS

BACKGROUND OF THE INVENTION

1. Field of the Invention

This invention relates to a system and method for removing water, carbon dioxide, and hydrogen sulfide from a gas stream containing these components and methane using a series of separators, including an absorber column that uses a methanol stream as an absorber to simultaneously substantially separate water and acid gases from methane in a single step. The system and method of the invention are particularly suitable for use with methane gas streams that do not contain other hydrocarbons, such as landfill gas (LFG).

2. Description of Related Art

It has been reported that more than 250 million tons of municipal solid waste are deposited in landfills each year. One million tons of municipal solid waste can produce 300 cfm of landfill gas (LFG) for as many as 20-30 years after being landfilled. LFG is a source of methane gas that is produced by the decomposition of organic matter in a landfill. LFG is typically flared to burn off the methane and prevent its release to the atmosphere. However, LFG may be also be collected and treated to recover the methane for energy use. Like natural gas streams, the LFG will contain impurities or contaminants, such as acid gases ($CO_2$ and $H_2S$), water, and nitrogen, that must be removed using various treatment processes to produce usable methane gas. LFG typically contains around 40 to 50% methane, around 30 to 40% carbon dioxide, around 0 to 1% hydrogen sulfide, around 15 to 40% nitrogen, and small amounts of water. Typically these treatment processes are separate, sequential processes, each resulting in a treated stream that is free or substantially free of the impurity or contaminant removed by the respective process before being passed on to the next process to remove the next impurity or contaminant. Water is usually removed from a feed stream using a dehydration process, typically achieved using glycol dehydration (absorption) or solid desiccant dehydration (adsorption). The dehydrated stream is then processed to remove $CO_2$ and $H_2S$, which may be achieved in separate processes or may be combined into a single process, such as using an amine treatment to remove these gases. The sweetened gas stream may then be processed to remove nitrogen to produce a usable methane stream.

It has not been generally known to combine removal of $CO_2$, $H_2S$, and water in a single process, as the stream must first be dehydrated prior to removal of the acid gases. For example, U.S. Pat. No. 4,770,676 discloses an adsorption system to separate $CO_2$ from methane in LFG, but water and $H_2S$ must be separately removed first. The system comprises a thermal swing adsorption (TSA) pre-treatment system to remove water, any hydrocarbon impurities, and $H_2S$ from the raw LFG feed stream using three adsorption columns to produce a treated stream comprising $CO_2$ and methane. The treated stream is then further treated in a pressure swing adsorption (PSA) system to separate the $CO_2$ from the methane. Depending on the number of bulk separation steps (four or five) used to separate $CO_2$ from methane after pre-treatment to selectively remove water or $H_2S$ in the '676 patent, the $CO_2$ waste stream may contain around 1.0-3.6% methane, which may be as much as 1.5% of the methane contained in the LFG feed stream.

There are a couple of known pretreatment methods for removing water, and partially removing $CO_2$, and $H_2S$ from streams containing methane in a single process, but they result in substantial losses of methane in the waste $CO_2/H_2S$ stream and require further treatment to remove remaining amounts of $CO_2$ and $H_2S$ from the methane. For Example, U.S. Pat. No. 5,520,249 discloses a method for removing water and substantial portions of $H_2S$ and $CO_2$ using a cyclone contact vessel, a separation drum, and a stripper, that is useful for feed streams containing around 55% methane, 11% $CO_2$, 34% $H_2S$, a small amount of water, and no other hydrocarbons. Methanol is added to the overhead stream from the stripper and a first portion of the overhead stream from the cyclone contact vessel prior to being partially condensed and feeding into the separation drum. The condensate stream (containing methane, $CO_2$, and $H_2S$) from the drum separator, along with a first portion of the methanol and water recovered from the drum separator, are recycled back into the cyclone contact vessel with the feed stream. A second portion of the recovered methanol and water are fed into the stripper along with the second portion of the overhead stream from the cyclone contact vessel. The overhead stream from the drum separator is the final, treated methane stream in the system of the '249 patent, which comprises around 73% methane, 11.1% $CO_2$, and 15.4% $H_2S$. The bottoms stream from the cyclone contact vessel is the waste stream in the system of the '249 patent, which comprises around 14.4% methane (equivalent to 8.5% of the feed stream methane), 10.5% $CO_2$ (equivalent to 33% of the feed stream $CO_2$), and 73.5% $H_2S$ (equivalent to 69% of the feed stream $H_2S$). While the system of the '249 patent is able to remove a substantial amount of $CO_2$ and $H_2S$, the amount remaining in the treated methane stream is still high, requiring additional treatment, and the amount of methane lost to the waste stream is too high.

Another example is U.S. Pat. No. 6,711,914, which discloses an improvement on the pre-treatment process in the '249 patent that avoids the transportation and regeneration expenses associated with the use of methanol. The system in the '914 patent is useful for feed streams containing amounts of methane, $CO_2$, $H_2S$, and water similar to those in the '249 patent. In the '914 patent, water and a substantial portion of $CO_2$ and $H_2S$ are removed by using a series of separators (or contacting zones/packed drums). The feed stream is cooled before feeding into a first separator, where it is separated into a first bottoms stream (primarily water that is reinjected into a well) and a first overhead stream that feeds into a second separator (a first contacting zone). The overhead stream from second separator feeds into a third separator (a second contacting zone). The bottoms stream from the second separator is the $CO_2/H_2S$ waste stream, which is also reinjected into a well. The overhead stream from the third separator, which contains essentially no water (less than 16 ppm), is partially condensed before feeding into a fourth separator (a separation drum). The bottoms stream from the third separator feeds back into the second separator. The condensate stream from the fourth separator feeds back into the third separator. The '914 patent utilizes the $H_2S$ in the condensate stream and the bottoms stream from the third separator to remove the remaining water from the overhead stream from the first separator. The overhead stream from the fourth separator is the final, treated methane stream in the '914 patent, which comprises around 76% methane, 11% $CO_2$, and 12.5% $H_2S$. This overhead stream is used for heat exchange with the overhead stream from the third separator and the feed stream. The $CO_2/H_2S$ waste stream in the system of the '914 patent comprises around 13% methane (equivalent to 6.95% of the feed stream methane), 9.7% $CO_2$ (equivalent to 27.7% of the feed stream $CO_2$), and 75.6% $H_2S$ (equivalent to 72.2% of the feed stream $H_2S$). In other embodiments disclosed in the '914 patent, the amount of methane lost to the waste stream is reduced to around 2.3%. While the loss of methane in the waste stream in the '914 patent is better than in the '249 patent, the methane loss is still too high and the amounts of $CO_2$ and $H_2S$ remaining in the treated methane stream are still too high.

There is a need for a system and method that can effectively and efficiently remove substantially all of the $CO_2$, $H_2S$, and water from a feed stream containing methane stream, particularly an LFG feed stream, in a single process without having to produce separate treated streams substantially free of the contaminant(s) or impurity(ies) removed by one process before feeding into the next treatment (or pretreatment) process and without requiring secondary treatment to remove remaining $CO_2$ and $H_2S$.

SUMMARY OF THE INVENTION

The systems and methods according to preferred embodiments of the invention disclosed herein facilitate the economically efficient removal of $CO_2$, $H_2S$, and water from a feed stream comprising these contaminants or impurities and methane. The systems and methods are particularly suited for treatment of streams where methane is the only hydrocarbon or where there are very small amounts of other hydrocarbons present, such as is typical for landfill gas (LFG). The systems and methods use methanol as a physical solvent to remove these contaminants in a single treatment process, which requires significantly less energy than conventional removal methods. Preferably, the water, $CO_2$, and $H_2S$ waste streams from the systems and methods according to preferred embodiments in total comprise less than 2% of the methane from the feed stream, more preferably less than 1.5% of the methane from the feed stream, and most preferably less than 1% of the methane from the feed stream. Most preferably, it is not required to dehydrate an LFG feed stream using glycol, solid desiccant, or other conventional methods to produce a dehydrated stream prior to treating the dehydrated stream to remove acid gases, such as $CO_2$ and $H_2S$. Most preferably, it is not required to use any amine treatment to remove $CO_2$ and $H_2S$ using the systems and methods of preferred embodiments of the invention. Most preferably, the systems and methods of the invention do not use membranes to separate methane from contaminants.

According to one preferred embodiment, a feed stream comprising methane, acid gas ($CO_2$, $H_2S$, or both), nitrogen, and water is separated through a series of separators and by using methanol as a physical solvent to remove the water, $CO_2$, and $H_2S$ to arrive at a treated methane stream comprising primarily methane and nitrogen in a single process without requiring separate processes to dehydrate the feed stream prior to removing acid gases. The separators preferably comprise a scrubber (a first separator) and an absorber column (a second separator). The feed stream feeds into the scrubber where it is separated into a scrubber overhead stream (a first overhead stream) and a scrubber bottoms stream (a first bottoms stream). A liquid portion of water from the feed stream is preferably removed by gravity in the scrubber into the scrubber bottoms stream, which is a waste stream comprising primarily water and small amounts of $CO_2$, $H_2S$, nitrogen, and methane. Most preferably, the overhead stream from the scrubber (the first overhead stream) feeds into a lower level of the absorber column and a methanol stream feeds into an upper level of the absorber. The water, $CO_2$, and $H_2S$ from are simultaneously substantially separated from the methane and nitrogen in the absorber column, with the majority of the water, $CO_2$, and $H_2S$ from the streams feeding into the absorber column exiting as an absorber bottoms stream (a second bottoms stream) and the majority of the methane and nitrogen exiting as an absorber overhead stream (a second overhead stream). The absorber overhead stream is a treated methane stream comprising methane and nitrogen and substantially free of any water, $CO_2$, or $H_2S$ and may be sent for further processing to remove nitrogen. According to another preferred embodiment, the feed stream is cooled in a first heat exchanger through heat exchange with the second overhead stream (from the second separator (or absorber)) prior to feeding into the first separator/scrubber. This first heat exchanger cools the feed stream and condenses excess water from the feed stream.

According to another preferred embodiment, the series of separators further comprise a first stripper column (a methane stripper or a third separator), a second stripper column (a methanol stripper or a fourth separator), a reflux accumulator (a fifth separator), and a methanol reclaimer column (a sixth separator). In this embodiment, most preferably, the overhead stream from the scrubber (the first overhead stream) and an overhead stream from the first stripper (a third overhead stream) feed into a lower level of the absorber column and a first portion of a bottoms stream from the second stripper (a first portion of the fourth bottoms stream), primarily comprising methanol, feeds into an upper level of the absorber column. The water, $CO_2$, and $H_2S$ from these streams are simultaneously substantially separated from the methane and nitrogen in the absorber column, with the majority of the water, $CO_2$, and $H_2S$ from the streams feeding into the absorber column exiting as an absorber bottoms stream (a second bottoms stream) and the majority of the methane and nitrogen from the streams feeding into the absorber column exiting as an absorber overhead stream (a second overhead stream). The absorber overhead stream is a treated methane stream comprising methane and nitrogen and substantially free of any water, $CO_2$, or $H_2S$ and may be sent for further processing to remove nitrogen. The absorber bottoms stream preferably feeds into a top of the first stripper column (a methane stripper column), where the nitrogen and methane are substantially removed from the water, $H_2S$, and $CO_2$, with the majority of the nitrogen and methane from the second bottoms stream exiting as an overhead stream (the third overhead stream) and the majority of the water, $H_2S$ and $CO_2$ from the second bottoms stream exiting as a third bottoms stream. Most preferably, the first stripper bottoms stream (the third bottoms stream) feeds into an upper level of the second stripper (a methanol stripper) and an overhead stream from the reclaimer column (a sixth overhead stream) feeds into a bottom level of the second stripper (a methanol stripper), where water and methanol are substantially separated from the remaining methane, nitrogen $CO_2$, and $H_2S$ with the majority of the water and methanol feeding into the second stripper exiting as a fourth bottoms stream and the majority of the methane, nitrogen $CO_2$, and $H_2S$ feeding into the second stripper exiting as a fourth overhead stream (primarily comprising $CO_2$). The second stripper overhead stream (the fourth overhead stream) preferably feeds into a reflux accumulator, where the water and methanol are again substantially separated from the remaining methane, nitrogen $CO_2$, and $H_2S$ with the majority of the water and methanol from the fourth overhead stream exiting as a fifth bottoms stream and the majority of the methane, nitrogen $CO_2$, and $H_2S$ from the fourth overhead stream exiting as a fifth overhead stream (primarily comprising $CO_2$). The fifth bottoms stream is preferably returned to the methanol stripper as a reflux stream. The fifth overhead stream is preferably a $CO_2$ and $H_2S$ vent stream (or waste stream) and preferably comprises less than 2%, more preferably less than 1%, of the methane from the feed stream. The fifth overhead stream also preferably comprises at least 98% of the $CO_2$ and at least 99% of the $H_2S$ from the feed stream and less than 1% of the water from the feed stream. Most preferably, the second stripper bottoms stream is split into first and second portions. The first portion, primarily comprising methanol, feeds into the absorber. The second portion preferably feeds into an upper level of the reclaimer column, where it is split into the reclaimer column overhead stream (the sixth overhead stream) that feeds into the second stripper and a reclaimer column bottoms stream (a sixth bottoms stream) that is another waste stream comprising primarily water and some methanol.

According to yet another preferred embodiment, the treated methane stream (the second overhead stream) from the second separator (or absorber) may be fed into an optional seventh separator (preferably a molecular sieve purifier) to further remove methanol prior to downstream processing for nitrogen removal, which avoids freezing issues in the cryogenic downstream equipment and minimized methanol loss. An overhead stream from the seventh separator (a seventh overhead stream) then becomes the final treated methane product stream, which is then sent for nitrogen removal. A overhead stream from the seventh separator (a seventh overhead stream), which primarily comprises methanol and a small amount of water may be recycled back into the system, preferably feeding into an upper level of the fourth separator (methanol stripper), for reuse of the methanol.

According to another preferred embodiment, around 80 to 90% of the water contained in the feed stream is removed as part of the first bottoms stream from the first separator/scrubber. According to another preferred embodiment, the sixth bottoms stream (from the sixth separator/methanol reclaimer) is preferably at least 90% water, with some remaining methanol and may be properly disposed of or recycled. According to another preferred embodiment, the second overhead stream (from the second separator (or absorber)) is a treated methane stream (when the optional seventh separator is not used, otherwise it is a feed stream to the seventh separator), preferably comprising at least 99% of the methane from the feed stream and at least 99.9% of the nitrogen from the feed stream. This treated methane stream is also preferably substantially free of water, $CO_2$ and $H_2S$, comprising less than 1.3 ppm water (more preferably less than 1.2 ppm water), less than 16 ppm $CO_2$ (more preferably less than 15.5 ppm $CO_2$), and less than 0.001 ppm $H_2S$ (more preferably less than 0.0009 ppm $H_2S$), so that no further treatment to remove water, $CO_2$, or $H_2S$ is required. The treated methane stream may then be sent for nitrogen removal to obtain a usable methane product stream.

According to other preferred embodiments, the optional seventh separator overhead stream is the final treated methane product stream of the system and method and comprises the same amounts of methane and nitrogen relative to or from the feed stream as the second overhead stream. Like the second overhead stream, the seventh overhead stream is preferably substantially free of water, $CO_2$, $H_2S$, and methanol, so that no further treatment to remove water, $CO_2$, or $H_2S$ is required. The seventh separator primarily serves to remove trace methanol from the second overhead stream, so that the methanol may be recovered and reused. A seventh separator bottoms stream preferably comprises primarily methanol and is preferably recycled back to feed into the fourth separator (methanol stripper).

According to another preferred embodiment, a liquid level in the second separator (or absorber) is maintained using a level control valve to control a flow rate of the second bottoms stream from the second separator to the third separator (or methane stripper), to maintain a sufficient level of methanol in the second separator (or absorber). According to another preferred embodiment, a liquid level in the third separator (or methane stripper) is maintained using another level control valve to control a flow rate of the third bottoms stream from the third separator to the fourth separator (or methanol stripper). According to another preferred embodiment, another control valve maintains the desired pressure within fourth separator (or methanol stripper) by controlling a flow rate of the fourth overhead stream. Most preferably, the pressure in the fourth separator (or methanol stripper) is maintained between 70 and 90 psia, more preferably between 75 and 85 psia.

According to another preferred embodiment, the third overhead stream (from the third separator (or methane stripper)) goes through two stages of heat exchange and is compressed prior to feeding in a bottom of the second separator (or absorber). Preferably, the third overhead stream passes through a another heat exchanger (a second heat exchanger in some preferred embodiments), is then compressed, then passes through another heat exchanger (a third heat exchanger in some preferred embodiments and preferably an air cooler), and then passes back through or is recycled back through the pre-compression heat exchanger (the second heat exchanger in some preferred embodiments) prior to feeding into the second separator (or absorber). The third overhead stream is thus initially warmed in a second heat exchanger located upstream of compression through heat exchange with the third overhead stream downstream of being compressed and downstream of being air-cooled, which results in sufficiently cooling and pressurizing the third overhead stream prior to feeding into the second separator (or absorber). When the third overhead stream feeds into the second separator (or absorber), it is preferably at a temperature of around 20 to 25° F. and a pressure of around 320 to 340 psia.

According to another preferred embodiment, the first portion of the fourth bottoms stream (from the fourth separator or methanol stripper) is cooled through several heat exchange stages prior to feeding into a top of the second separator (or absorber). Most preferably, the first portion of the fourth bottoms stream passes through a heat exchanger (a fourth heat exchanger in some preferred embodiments or a second heat exchanger in other preferred embodiments, and preferably an air cooled exchanger) downstream of being split, then undergoes heat exchange with the third bottoms stream (from the third separator or methane stripper), then is chilled in a chiller (a sixth heat exchanger in some preferred embodiments or a fourth heat exchanger in other preferred embodiments) prior to feeding into the second separator (or absorber). The heat exchange with the third bottoms stream occurs prior to (upstream of) the third bottoms stream feeding into the fourth separator (or methanol stripper) and prior to (upstream of) the first portion of the fourth bottoms stream passing through the chiller and is most preferably achieved in two stages. First, the first portion of the fourth bottoms stream is cooled in a heat exchanger (a fifth heat exchanger in some preferred embodiments or a third heat exchanger in other preferred embodiments) through heat exchange with the third bottoms stream after the third bottoms stream exits from a reboiler for the third separator (or methane stripper) and upstream of the third bottoms stream feeding into a bottom of the fourth separator. Second, the first portion of the fourth bottoms stream is then further cooled by passing through the tube side of the reboiler for the third separator (or methane stripper). According to another preferred embodiment, the first portion of the fourth bottoms stream is pumped using a first pump to increase its pressure prior to feeding into the second separator. Most preferably, the first pump is located downstream of the reboiler for the third separator (or methane stripper) and upstream of the chiller. Most preferably, the first portion of the fourth bottoms stream feeds into the second separator at a temperature of −30 to −40° F. and a pressure of 300 to 320 psia.

According to another preferred embodiment, the fourth overhead stream is cooled in a heat exchanger (a seventh heat exchanger in some preferred embodiments or a second heat exchanger in other preferred embodiments) prior to the fourth overhead stream feeding into the reflux accumulator/fifth separator, through heat exchange with the fifth overhead stream. According to another preferred embodiment, the cooled fourth overhead stream is then further cooled in another heat exchanger (an eighth heat exchanger in some preferred embodiments or a third heat exchanger in other preferred embodiments) with an external refrigerant downstream of cooling through heat exchange with the fifth overhead stream and upstream of feeding into the reflux accumulator/fifth separator. These two cooling stages allow the fourth overhead stream to be sufficiently cooled, preferably to a temperature of around −30 to −40° F., more preferably around −34 to −37° F. prior to feeding into the reflux accumulator/fifth separator to sufficiently condense the methanol to allow it to be separated by gravity in the reflux accumulator/fifth separator and to minimize loss of methanol in the fifth overhead stream ($CO_2/H_2S$ vent stream). Along with the reflux accumulator/fifth separator, these heat exchangers act as a condenser for the fourth separator/methanol stripper.

According to another preferred embodiment, a surge drum is provided for the fourth bottoms stream in order to maintain a sufficient supply of lean methanol to allow for several days of operation before methanol needs to be added to the system. Methanol is preferably added to the system at start-up and for replenishment, as needed, through the surge drum.

According to another preferred embodiment, around 80 to 90% of the water contained in the feed stream is removed as part of the first bottoms stream from the first separator (scrubber) and the first bottoms stream is substantially free of methane, nitrogen, and $H_2S$ and has a small amount of $CO_2$. According to another preferred embodiment, the second bottoms stream (from the second separator or absorber) preferably comprises around 80 to 85% methanol, around 10 to 15% $CO_2$, around 0.01 to 0.03% $H_2S$, around 2 to 4% water, around 0.1 to 0.2% nitrogen, and around 0.5 to 1.5% methane and is at a temperature of around 5 to 15° F. and a pressure of around 300 to 320 psia. According to another preferred embodiment, the third bottoms stream (from the third separator or methane stripper) preferably comprises around 80 to 90% methanol, around 8.5 to 9.0% $CO_2$, around 0.02 to 0.03% $H_2S$, around 3 to 4% water, around 0 to 0.0001% nitrogen, and around 0.05 to 0.15% methane and is at a temperature of around 10 to 15° F. and a pressure of around 100 to 110 psia. According to another preferred embodiment, the fourth bottoms stream (from the fourth separator or methanol stripper) preferably comprises around 95 to 98% methanol, around 1 to 3% water and trace amounts of $CO_2$, $H_2S$, nitrogen and methane and is at a temperature of around 240 to 260° F. and a pressure of around 85 to 95 psia. According to another preferred embodiment, the fifth bottoms stream (from the fifth separator or reflux accumulator) preferably comprises around 70 to 80% methanol, around 20 to 25% $CO_2$, around 0 to 1.5% water and trace amounts of $H_2S$, methane, and nitrogen methane and is at a temperature of around −30 to −40° F. and a pressure of around 75 to 85 psia prior to being pumped to a pressure of around 90 to 110 psia for feeding back into the fourth separator (or methanol stripper) as a reflux stream. According to another preferred embodiment, the sixth bottoms stream (from the sixth separator or methanol reclaimer) is preferably at least 90% water and around 5 to 15% methanol and is substantially free of methane, nitrogen, $CO_2$, and $H_2S$. The sixth bottoms stream may be properly disposed of or recycled. According to another preferred embodiment, the optional seventh bottoms stream (from the optional seventh separator or molecular sieve purifier) comprises around 95 to 100% methanol, 0 to 5% water, less than 6 ppm $H_2S$ (more preferably less than 5.5 ppm $H_2S$), and zero or trace amounts of $CO_2$, nitrogen, and methane and is at a temperature of around 70 to 80° F. and a pressure of around 300 to 310 psia.

According to another preferred embodiment, the first overhead stream (from the first separator or scrubber) preferably comprises around 10 to 50% $CO_2$, around 0 to 0.25% $H_2S$, around 0 to 0.1% water, around 10 to 40% nitrogen, and around 30 to 75% methane and is at a temperature of around 30 to 50° F. and a pressure of around 300 to 325 psia. According to another preferred embodiment, the second overhead stream (from the second separator or absorber) is the treated methane stream (when the optional seventh separator is not used, otherwise it is a feed stream to the seventh separator), preferably comprising near 100% of the methane from the feed stream and at least 99% of the nitrogen from the feed stream. The treated methane stream is also preferably substantially free of $CO_2$ and $H_2S$, comprising less than 16 ppm $CO_2$ (more preferably less than 15 ppm $CO_2$) and less than 1 ppm $H_2S$ (more preferably less than 0.001 ppm $H_2S$), so that no further treatment to remove $CO_2$ or $H_2S$ is required. The treated methane stream may then be sent for nitrogen removal to obtain a usable methane product stream. According to another preferred embodiment, the third overhead stream (from the third separator or methane stripper) preferably comprises around 0 to 0.2% methanol, around 70 to 80% $CO_2$, around 0 to 0.1% $H_2S$, around 0 to 0.1% water, around 2 to 3% nitrogen, and around 20 to 30% methane and is at a temperature of around −5 to +5° F. and a pressure of around 90 to 110 psia, prior to any heat exchange or compression. According to another preferred embodiment, the fourth overhead stream (from the fourth separator or methanol stripper) preferably comprises around 2 to 5% methanol, around 90 to 98% $CO_2$, around 0 to 0.5% $H_2S$, around 0 to 0.1% water, around 0 to 0.1% nitrogen, and around 0.5 to 1.5% methane and is at a temperature of around 80 to 90° F. and a pressure of around 80 to 100 psia, prior to any heat exchange. According to another preferred embodiment, the fifth overhead stream (from the fifth separator or reflux accumulator) preferably comprises less than 0.05% methanol, around 96 to 99% $CO_2$, around 0.1 to 0.5% $H_2S$, less than around 2 ppm water, less than 0.01% nitrogen, and less than 1.5% methane and is at a temperature of around −35 to −40° F. and a pressure of around 70 to 90 psia, prior to any heat exchange or further processing. According to another preferred embodiment, the sixth overhead stream (from the sixth separator or methanol reclaimer) preferably comprises around 95 to 99% methanol, less than 7.5 ppm $CO_2$, less than 0.002 ppm $H_2S$, around 2 to 5% water, 0% nitrogen, and less than 1 ppm methane (more preferably less than 0.01 ppm methane) and is at a temperature of around 250 to 300° F. and a pressure of around 120 to 130 psia. According to another preferred embodiment, the optional seventh overhead stream (from the seventh separator or methanol purifier) preferably comprises 0% methanol, less than 16 ppm $CO_2$ (more preferably less than 15 ppm $CO_2$), 0% $H_2S$, 0% water, around 30 to 40% nitrogen, and around 60 to 70% methane and is at a temperature of around 70 to 80° F. and a pressure of around 300 to 310 psia.

The systems and method of the preferred embodiments of the invention have the advantage of being able to simultaneously substantially separate water and acid gases from a feed stream comprising water, acid gases, and methane in a single step using methanol as an absorber stream that is economically efficient and requires less energy that typical prior art systems that have to remove water prior to separately removing acid gases. The systems and method of the preferred embodiments of the invention also have the advantages of minimizing loss of methane in the waste streams to less than 2%, most preferably less than 1%, of the methane in the feed stream and of sufficiently removing the water, $CO_2$ and $H_2S$ from the treated methane stream that no further processing to remove water, $CO_2$, or $H_2S$ is needed prior to proceeding the treated methane stream to remove nitrogen.

BRIEF DESCRIPTION OF THE DRAWINGS

The system and method of the invention are further described and explained in relation to the following drawings wherein.

DESCRIPTION OF THE PREFERRED EMBODIMENTS

Figure 1:
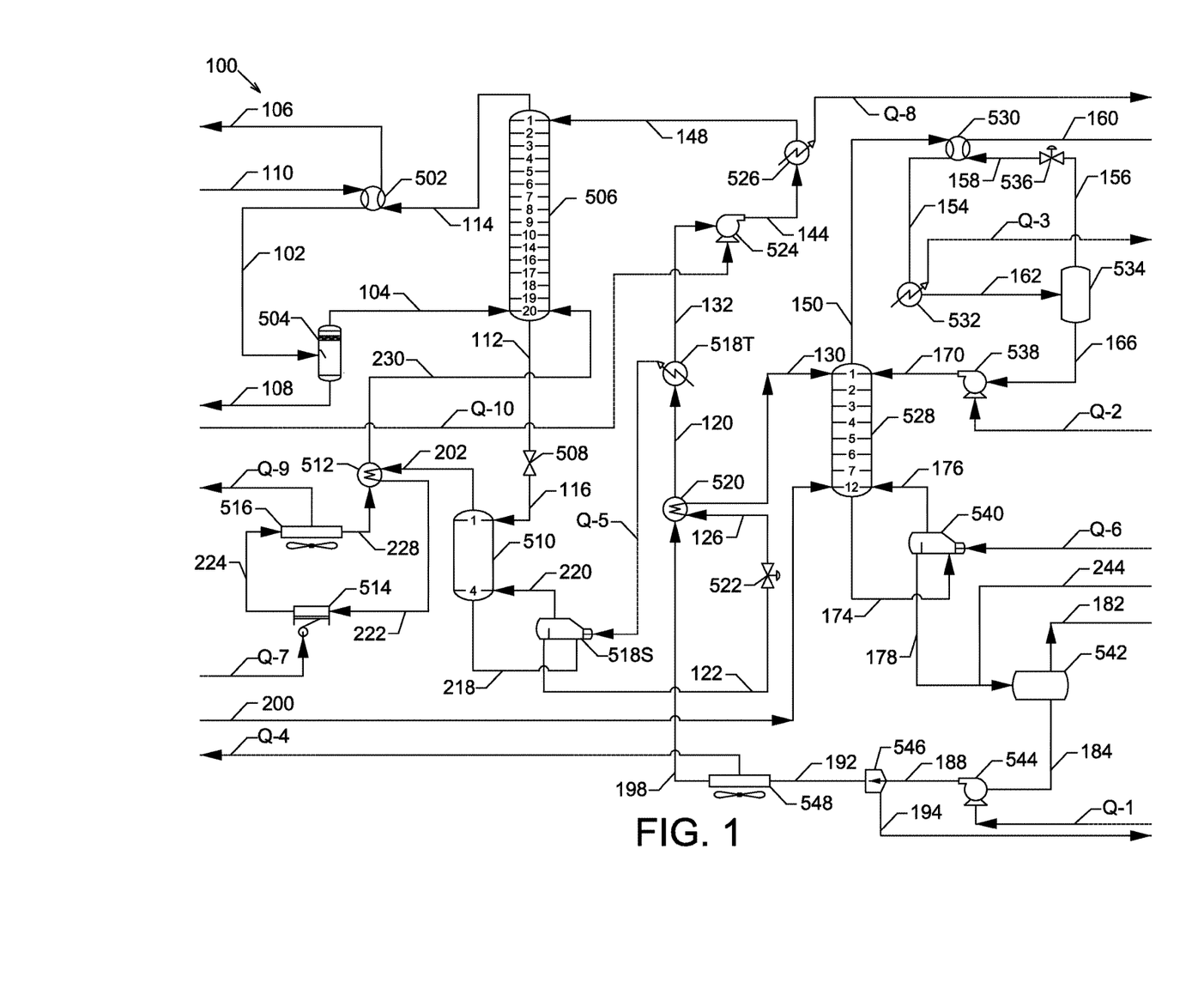
FIG. 1 is a process flow diagram illustrating principal processing stages of one preferred embodiment of a system and method for removing $CO_2$, $H_2S$ and water from a methane stream according to the invention.
Figure 2:
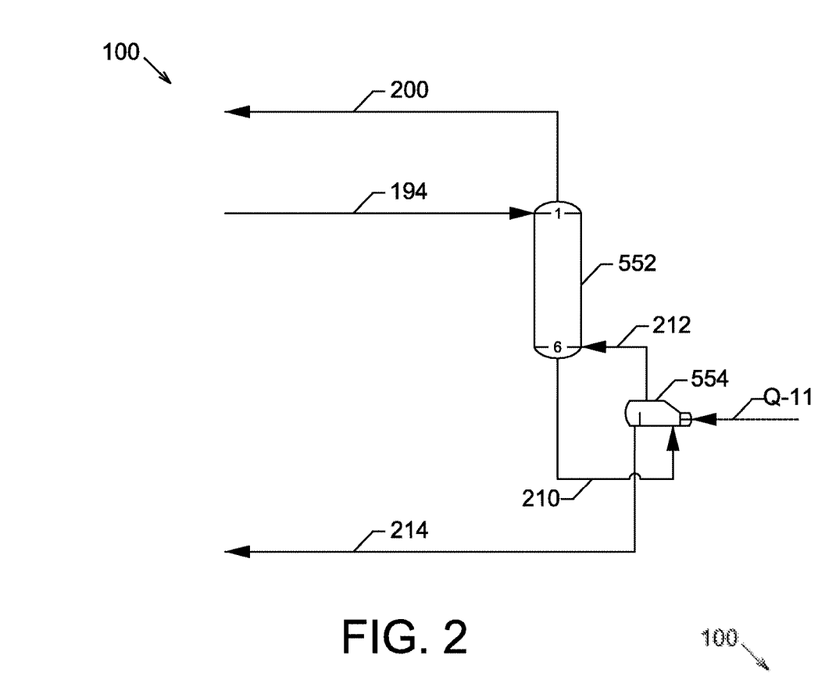
FIG. 2 is a process flow diagram illustrating another portion of the system and method of FIG. 1.

Referring to FIGS. 1-2, a system 100 for separating $CO_2$, $H_2S$, and water from an LFG feed stream 110 according to a preferred embodiment of the invention is provided. LFG feed stream 110 has preferably not been pretreated to remove any gaseous components or water vapor, but may be pretreated as necessary to separate any solids or liquids from the gas stream prior to feeding into system 100 as LFG feed stream 110, as will be understood by those of ordinary skill in the art. LFG feed stream 110 preferably comprises around 30 to 60% methane, around 30 to 50% $CO_2$, around 0 to 0.25% hydrogen sulfide, and around 0 to 1% water. LFG feed stream 110 may also contain trace amounts of other contaminants or impurities, but preferably comprises around 1% or less, more preferably around 0.1% or less, of ethane or heavier hydrocarbons. System 100 is capable of processing LFG feed streams of around 1 to 25 MMSCFD. Most preferably, LFG feed stream 110 has a pressure of around 300 to 350 and a temperature of around 75 to 125° F.

LFG feed stream 110 feeds into inlet gas cooler 502 (a first heat exchanger), which reduces the temperature of feed stream 110 prior to feeding into inlet gas scrubber 504 (a first separator) as stream 104 and it condenses excess water from stream 110. Stream 110 exits cooler 502 as stream 102, preferably having been cooled to around 40 to 60° F. Cooled stream 102 preferably feeds into inlet scrubber 504 which allows for gravity separation of the condensed water into a first bottoms 108. A first overhead vapor stream 104 then feeds into inlet gas absorber 506 (a second separator). Inlet gas absorber is preferably a fractionation column that allows a stream 148 comprising primarily methanol (lean methanol) to contact the entering gas stream 104 (and stream 230 from the methane stripper or third separator) to separate methane and nitrogen from $CO_2$, $H_2S$, and remaining water. Most preferably, vapor stream 104 enters into a lower or bottom stage location of absorber column 506 and the column preferably has at least around 20 theoretical stages to allow for thorough contact of the gas and liquid stream.

Overhead stream 114 (a second overhead stream) exits absorber column 506. Stream 114 preferably comprises around 60 to 75% methane, around 30 to 50% nitrogen, and around 0.01 to 0.02% methanol, with trace amounts of $CO_2$, $H_2S$, and water. Most preferably, stream 114 comprises at least 98%, more preferably at least 99% of the methane from feed stream 110. Stream 114 is preferably at a temperature of around −30 to −40° F. before passing through inlet gas cooler 502, exiting as stream 106, preferably having been warmed to around 70 to 80° F. According to one preferred embodiment, stream 106 is the treated methane stream (when the optional seventh separator is not used), preferably comprising at least 98% of the methane from the feed stream and at least 99% of the nitrogen from the feed stream. Stream 106 is also preferably substantially free of $CO_2$ and $H_2S$, comprising around 15 ppm $CO_2$ and less than 1 ppm (more preferably less than 0.001 ppm) $H_2S$, so that no further treatment to remove $CO_2$ or $H_2S$ is required. The treated methane stream 106 may then be sent for nitrogen removal to obtain a nitrogen vent stream and a usable methane product stream. Stream 106 may also be optionally sent to a methanol purifier 550 (a seventh separator), as part of system 100 further described below, to remove remaining methanol prior to being sent for nitrogen removal.

A second bottoms stream 112 exits absorption column 506, preferably comprising around 0 to 2% methane, around 10 to 15% $CO_2$, around 0 to 0.05% $H_2S$, around 2 to 5% water, and around 80 to 90% methanol. The methanol in column 506 absorbs most of the $CO_2$, $H_2S$, and water that was in stream 104 and exits the bottom of the column as stream 112. Stream 112 is preferably at a temperature of around 5 to 15° F. and a pressure of around 300 to 325 psia before passing through absorber level control valve 508, exiting as stream 116 having been cooled to a temperature of around 0 to 5° F. and having a pressure of around 100 to 110 psia. Absorber level control valve 508 controls the liquid level in absorber column 506 at a specific level to achieve the desired absorption of impurities by the methanol flowing through column 506. For example, a transmitter on a level control instrument (measuring differential pressure, for example) may be field calibrated to read 0 to 100% of the operating range and be used to control valve 508 to maintain the liquid level at around 50% of the transmitter range. When valve 508 opens, methanol coming into the top of column 506 in stream 148 exits the bottom of the column through stream 112 and 116. When the pressure is reduced from stream 112 to stream 116 through valve 508, there will be some vapor breaking out from the solution in stream 116. Stream 116 then feeds into a methane stripper column 510 (a first stripper column or a third separator), preferably at an upper or top location. Methane stripper column 510 removes excess methane from the second bottoms stream so that it can be returned back to inlet gas absorber 506. This significantly reduces the amount of methane that will ultimately be present in the $CO_2/H_2S$ waste stream 160.

A third overhead stream 202 exits methane stripper column 510, preferably comprising around 20 to 25% methane, around 70 to 80% $CO_2$, and around 0.1 to 0.25% methanol, with trace amounts of $H_2S$ and water. Stream 202 is preferably at a temperature of around 0 to 5° F. before passing through methane stripper overhead heat exchanger 512 (a second heat exchanger in this preferred embodiment), exiting as stream 222 having been warmed to a temperature around 100 to 120° F. Methane stripper overhead heater 512 is preferably a shell and tube heat exchanger. Stream 222 is then compressed in methane stripper recompressor 514 to increase the pressure to a level sufficient to allow the third overhead stream to feed back into inlet gas absorber column 506. Compressed stream 224 exits recompressor 514, preferably at a pressure of around 330 to 350 psia and a temperature of around 300 to 350° F. Stream 224 then passes through methane compressor discharge cooler 516 (a third heat exchanger in this preferred embodiment, preferably an air cooled heat exchanger), exiting as stream 228 cooled to around 100 to 120° F. Stream 228 then passes through methane stripper overhead heater 512 (the second heat exchanger in this preferred embodiment), exiting as stream 230 having been further cooled to around 20 to 30° F. Stream 230 preferably feeds back into the inlet gas absorber 506 near or at a bottom stage location.

A stream 218 from a bottom of methane stripper column 510 preferably feeds into a shell side 518S of a methane stripper reboiler 518S/518T (a first reboiler) where it is partially vaporized, with stream 220 returning to a bottom of column 510 and stream 122 exiting as a third bottoms stream. Reboiler 518S/518T adds sufficient heat to the third separator (or methane stripper) to allow the third separator to reject the desired amount of methane from the incoming stream (the second bottoms stream). Heat is supplied from a tube side of methane stripper reboiler 518T from a first portion of a fourth bottoms stream, discussed further below. Reboiler 518S/518T adds heat to column 510 to allow the desired amount of methane to be rejected from the incoming stream 116. Third bottoms stream 122 preferably comprises around 80 to 90% methanol, around 5 to 10% $CO_2$, and around 2 to 5% water, with small amounts of $H_2S$, methane and nitrogen. Stream 122 is preferably at a temperature of around 10 to 15° F. and a pressure of around 75 to 125 psia before passing through methane stripper level control valve 522. Valve 522 maintains the desired operating level in methane stripper column 510. For example, valve 522 may be controlled according to a measured parameter, such as pressure, to maintain the liquid level at around 50% of the measured range. Stream 126 exits valve 522 at a slightly reduced pressure and temperature and then passes through lean/rich methanol exchanger 520 (a fifth heat exchanger in this preferred embodiment), exiting as stream 130. Stream 130 is preferably at a temperature of around 70 to 90° F. before feeding into an upper or top stage of methanol stripper column 528 (a second stripper column or a fourth separator).

Methanol stripper column 528 rejects or removes the absorbed impurities from the rich methanol stream coming from the upstream absorber 506. The impurities are removed by adding heat to the bottom of stripper 528 with reboiler 540 and simultaneously removing heat from overhead stream 150 (a fourth overhead stream) with heat exchangers 530, 532. Overhead stream 150 preferably comprises around 90 to 99% $CO_2$, around 2 to 5% methanol, around 0 to 0.5% $H_2S$, less than 1.25% methane, and small amounts of water and nitrogen. Stream 150 is preferably at a temperature of around 75 to 95° F. before passing through stripper overhead warm reflux condenser 530 (a seventh heat exchanger in this preferred embodiment), exiting as stream 154 preferably at a temperature of around 20 to 30° F. Stream 154 then passes through stripper overhead cold reflux condenser 532 (an eighth heat exchanger in this preferred embodiment), where external refrigeration is supplied to further condense the exiting stream 162. Heat exchanger 530 is preferably a shell and tube heat exchanger designed to partially condense overhead stream 150 to reduce the amount of refrigeration required in heat exchanger 532. Heat exchanger 532 is also preferably a shell and tube heat exchanger that is designed to complete the necessary condensing process, cooling exiting stream 162 down to a temperature of around −30 to −40° F. Having stream 162 at this temperature range aids in minimizing methanol loss in the $CO_2/H_2S$ vent stream 160. Stream 162 feeds into stripper reflux accumulator 534 (a fifth separator), which allows gravity separation of the condensed methanol (and remaining water) into bottoms stream 166 (a fifth bottoms stream) and remaining $CO_2$ and $H_2S$ into overhead stream 156 (a fifth overhead stream). Stream 156 is preferably at a temperature of around −35 to −40° F. and a pressure of around 70 to 90 psia before passing through stripper back pressure control valve 536, which maintains the desired pressure in methanol stripper column 528 of around 70 to 90 psia. Stream 158 exits control valve 536, preferably at a temperature of around −40 to −55° F. and a pressure of around 20 to 30 psia before passing through stripper overhead warm reflux condenser 530. Stream 158 exits heat exchanger 530 as stream 160 preferably at a temperature of around 60 to 80° F. Stream 160 is the waste $CO_2/H_2S$ stream. Stream 160 (still the fifth overhead stream) preferably comprises around 95 to 99% $CO_2$, around 0 to 0.5% $H_2S$, and less than 0.01% nitrogen, less than 0.05% methanol, less than 1.25% methane, and around 0.2 ppm water. Preferably, stream 160 comprises less than 1% of the methane in inlet feed stream 110, more preferably less than 0.75% of the methane in inlet feed stream 110. Preferably, stream 160 comprises at least 99.5%, more preferably at least 99.9% of the $CO_2$ in the inlet feed stream 110 and at least 99.5%, more preferably at least 99.9% of the $H_2S$ in the inlet feed stream 110.

Fifth bottoms stream 166 preferably comprises around 20 to 25% $CO_2$, around 0 to 0.5% $H_2S$, around 1 to 1.5% water, around 70 to 80% methanol, around 0 to 0.2% methane, and trace amount of nitrogen. Stream 166 is at a temperature of around −30 to −40° F. and a pressure of around 70 to 90 psia before entering pump 538, exiting as stream 170 at a pressure of around 90 to 110 psia. Pump 538 increases the pressure to allow the condensed liquid in stream 170 to return to the fourth separator 528. Stream 170 is fed back into a top level of the fourth separator 528 as a reflux stream.

Stream 174 from a bottom of column 528 feeds into reboiler 540 (a second reboiler) where it is partially vaporized with stream 176 returning to the bottom of column 528 and stream 178 exiting as a bottoms stream (a fourth bottoms stream) from column 528. Reboiler 540 is preferably a shell and tube heat exchanger that boils out impurities from methanol stream 174. Bottoms stream 178 preferably comprises around 95 to 99% methanol and around 1 to 5% water, with small or trace amounts of nitrogen, methane, $CO_2$ and $H_2S$. Stream 178 is preferably at a temperature of around 225 to 26° F. Stream 178 preferably feeds into stripper surge drum 542, which holds sufficient lean methanol for several days of operation before additional methanol would need to be added. Lean methanol booster pump 544 pumps stream 184 out of surge drum 542 to increase the pressure and provide necessary flow through to the inlet of primary methanol pump 524 (a first pump). Stream 184 is preferably at a pressure of around 80 to 100 psia, while pumped stream 188 is preferably at a pressure of around 150 to 175 psia. Stream 188 is split in lean methanol splitter 546 into steams 192 (a first portion of the fourth bottoms stream) and 194 (a second portion of the fourth bottoms stream), allowing the first portion stream 192 to feed into the absorber column 506 and the second portion 194 to feed into the methanol reclaimer 552. Stream 194 feeds into a top of methanol reclaimer 552 (a sixth separator), as further described below. Stream 192 passes through lean methanol cooler 548 (a fourth heat exchanger in this preferred embodiment), exiting as stream 198 at a temperature of around 110 to 120° F. Cooler 548 is preferably an air cooled heat exchanger to reduce the temperature of the lean methanol stream 198/144 prior to final cooling in lean methanol chiller 526 (a sixth heat exchanger in this preferred embodiment).

Stream 198 passes through a lean/rich methanol heat exchanger 520, exiting as cooled stream 120. Heat exchanger 520 is preferably a shell and tube heat exchanger that exchanges heat between a rich methanol stream 126 (the third bottoms stream, downstream from absorber 506) and lean methanol stream 198 (the first portion of the fourth bottoms stream, downstream from methanol stripper 528). Stream 120 is preferably at a temperature of around 20 to 25° F. before passing through the tube side 518T of methane stripper reboiler 518S/518T, exiting as stream 132, preferably at a temperature of around 5 to 10° F. Stream 132 is pumped in primary methanol pump 524 (the first pump), increasing the pressure of exiting stream 144 to around 300 to 350 psia, as necessary for stream 148 (from stream 144) to feed into the second separator (or absorber column) 506. Stream 144 passes through lean methanol chiller 526 (the sixth heat exchanger in this preferred embodiment) that provides external refrigeration to stream 144, which exits chiller 526 as stream 148 preferably at a temperature of around −30 to −40° F. Cooling to this range allows stream 148 to absorb more impurities in the second separator 506. Stream 148 then feeds back into a top or upper stage of absorber 506.

Stream 194 (the second portion of the fourth bottoms from methanol stripper 528) feeds into a top or upper stage of methanol reclaimer column 552. Column 552 is a fractionation column designed to fractionate methanol away from water to purify the water to preferably around 90%. Stream 210 from a bottom of column 552 feeds into reboiler 554 (a third reboiler), where it is partially vaporized, with stream 212 returning to column 552 and stream 214 exiting as the bottoms stream (a sixth bottoms stream). Reboiler 554 provides sufficient heat to the sixth separator (or methanol reclaimer) to allow it to operate satisfactorily. Bottoms stream 214 preferably comprises around 85 to 95% water and around 1 to 15% methanol and is disposed of using appropriate methods. Overhead stream 200 (a sixth overhead stream) preferably comprises around 95 to 99% methanol, around 1 to 5% water, and small or trace amounts of methane, nitrogen, $CO_2$ and $H_2S$. Stream 200 is preferably at a temperature of around 250 to 300° F. and feeds back into a bottom or lower stage of methanol stripper column 528.

Figure 3:
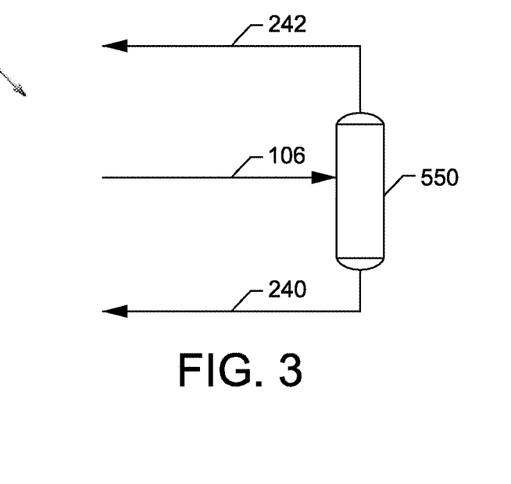
FIG. 3 is a process flow diagram illustrating an optional processing stage of the system and method of FIG. 1.

According to another preferred embodiment, system 100 further comprises a seventh separator 550 as shown in FIG. 3. Separator 550 (a molecular sieve purifier) is optional and not required for operation of system 100, but is preferred. When seventh separator 550 is used, absorber overhead stream 106 feeds into methanol purifier 550 prior to being sent for removal of nitrogen. Optional methanol purifier 550 is preferably a molecular sieve purifier that removes any remaining trace amounts of methanol from stream 106 prior to entering cryogenic equipment downstream of purifier 550 (in a nitrogen removal process), to avoid downstream freezing issues. Methanol purifier 550 is preferably included when downstream cryogenic equipment will be used and the methanol content of stream 106 exceeds around 100 ppm. Overhead stream 242 (a seventh overhead stream) preferably comprises at least 99.9% of the methane from the feed stream and at least 99.9% of the nitrogen from the feed stream. Stream 242 is also preferably substantially free of water, $CO_2$ and $H_2S$, comprising preferably zero water, around 15 ppm or less $CO_2$, preferably zero $H_2S$, and preferably zero methanol, so that no further treatment to remove water, $CO_2$, or $H_2S$ is required. The treated methane stream 242 may then be sent for nitrogen removal to obtain a nitrogen vent stream and a usable methane product stream. Bottoms stream 240 (a seventh bottoms stream) preferably comprises around 95 to 99.9% methanol, around 0 to 1 water, preferably zero $CO_2$, around 5.5 ppm or less $H_2S$ (preferably zero $H_2S$), and preferably zero methane. Bottoms stream 240 may be recycled back to system 100 to reuse the methanol. Most preferably bottoms stream 240 is mixed with stream 130 and feed into methanol stripper 528.

Acceptable inlet compositions in which preferred embodiments of the system and method of this invention may operate satisfactorily are listed in the following Table 1:

TABLE 1

| INLET STREAM COMPOSITIONS | |
|---|---|
| Inlet Component | Acceptable Inlet Composition Ranges |
| Methane | 20-80% |
| Ethane and Heavier Components | 0-1% |
| Carbon Dioxide | 10-60% |
| Hydrogen Sulfide | 0-1% |
| Water | 0-0.5% |

According to another preferred embodiment, a method of removing water and acid gases from a feed stream comprising water, acid gases and methane comprises: (1) removing water and the one or more acid gases from the feed stream by separating components of the feed stream in a series of separators comprising an absorber column to produce the treated methane stream, one or more waste water streams, and an acid gas waste stream and (2) supplying an absorber stream primarily comprising methanol to the absorber column, wherein the treated methane stream comprises at least 99% of the methane from the feed stream and is substantially free of water and the one or more acid gases and wherein the acid gases comprise $CO_2$, $H_2S$, or both. Most preferably, the feed stream is not dehydrated prior to separating the one or more acid gases in the removing step. Most preferably, no streams are dehydrated prior to feeding into the absorber column. Most preferably, water and the one or more acid gases are simultaneously substantially separated from the methane in the absorber column and wherein an overhead stream from the absorber column is the treated methane stream. Most preferably, the acid gas waste stream is substantially free of methane and comprises less than 1% of the methane from the feed stream. Although systems and methods of the preferred embodiments do not separate nitrogen from methane, the feed stream may also comprise nitrogen. When the feed stream comprises nitrogen, most of the nitrogen passes through the systems of preferred embodiments with the methane to exit with the treated methane stream. Most preferably, the treated methane stream is not processed to further remove water or acid gases prior to being processed to remove nitrogen when nitrogen removal is required.

According to other preferred embodiments, a method of removing of removing water and acid gases from a feed stream comprising water, acid gases and methane further comprises one or more of the following steps: (3) cooling the feed stream in a first heat exchanger through heat exchange with a second overhead stream to at least partially condense the water in the feed stream; (4) wherein the removing step comprises separating the cooled feed stream in a first separator downstream of the first heat exchanger into a first overhead stream and a first bottoms stream, which is a first of the waste water streams and wherein the first overhead stream comprises around 80 to 90% of the water from the feed stream; (5) splitting a fourth bottoms stream into a first portion and a second portion; (6) wherein the removing step further comprises: (a) separating the first overhead stream, a third overhead stream, and at least the first portion of a fourth bottoms stream comprising methanol in a second separator into the second overhead stream and a second bottoms stream, (b) separating the second bottoms stream in a third separator into the third overhead stream and a third bottoms stream, (c) separating the third bottoms stream, a fifth bottoms stream, and a sixth overhead stream in a fourth separator into a fourth overhead stream and a fourth bottoms stream, (d) separating the fourth overhead stream into a fifth overhead stream and the fifth bottoms stream in a fifth separator, and (e) separating the second portion of the fourth bottoms stream in a sixth separator into the sixth overhead stream and a sixth bottoms stream, wherein the second separator is the absorber column, the fifth overhead stream is the acid gas waste stream, the second overhead stream is the treated methane stream; and the sixth bottoms stream is a second of the waste water streams; (7) warming the third overhead stream in a second heat exchanger; (8) compressing the third overhead stream downstream of the second heat exchanger; (9) cooling the third overhead stream in a third heat exchanger downstream of the compression step; (10) recycling the third overhead stream through the second heat exchanger downstream of the third heat exchanger to further cool the recycled third overhead stream, wherein the recycled third overhead stream feeds into the second separator downstream of the second heat exchanger; (11) cooling the first portion of the fourth bottoms stream by passing the first portion of the fourth bottoms stream through in a series of heat exchangers prior to feeding into the second separator, wherein the first portion of the fourth bottoms stream is at a temperature of around −30 to −40° F. when it feeds into the second separator; (12) wherein the cooling in step 11 preferably comprises (a) passing the first portion through a fourth heat exchanger comprising an air cooler downstream of the splitting step, (b) passing the first portion through a fifth heat exchanger downstream of the fourth heat exchanger, wherein the first portion is cooled through heat exchange with the third bottoms stream, (c) passing the first portion through a reboiler for the third separator downstream of the fifth heat exchanger; and (d) passing the first portion through a sixth heat exchanger downstream of the reboiler, wherein the first portion is cooled with an external refrigerant; (13) pumping the first portion of the fourth bottoms stream prior to feeding into the second separator to increase the pressure of the first portion of the fourth bottoms stream to around 300 to 320 psia; (14) cooling the fourth overhead stream through heat exchange with the fifth overhead stream in a seventh heat exchanger; (15) cooling the fourth overhead stream in an eighth heat exchanger with an external refrigerant, wherein the eighth heat exchanger is downstream of the seventh heat exchanger and upstream of the fourth overhead stream feeding into the fifth separator; (16) pumping the fifth bottoms stream to increase the pressure of the fifth bottoms stream to around 90 to 110 psia prior to feeding into the fourth separator as a reflux stream; (17) separating the second overhead stream in a seventh separator into a seventh overhead stream and seventh bottoms stream, wherein the seventh overhead stream is a final treated methane stream comprising at least 99% of the methane from the feed stream and is substantially free of water, $CO_2$, and $H_2S$ and the seventh bottoms stream comprises at least 99% methanol and is recycled for use in the second separator; (18) controlling a liquid level in the second separator at a desired level using a first control valve; (19) controlling a liquid level in the third separator at a desired level using a second control valve; and/or (20) controlling a pressure in the fifth separator at a desired level using a third control valve.

Most preferably, the preferred methods do not use any amine treatment is used to remove acid gases from the feed stream and do not use any membranes are used to remove water or acid gases from the feed stream. Most preferably, system according to preferred embodiments of the invention is used to carry out the methods according to the invention.

Example 1—Computer Simulation for 1000 lbmol/hr LFG Feed

Still referring to FIGS. 1-3, a system 100 and method for processing a 1000 lbmol/hr LFG feed stream 110, comprising approximately 20 mol % nitrogen, 44.6 mol % methane, 35 mol % $CO_2$, 0.1 mol % $H_2S$, and 0.3 mol % water at 100° F. and 315 psia, according to a preferred embodiment of the invention based on a computer simulation is shown and described below. LFG feed stream 110 has preferably not been pretreated to remove any water or acid gases ($CO_2$) or $H_2S$ prior to processing in system 100. LFG feed stream 110 feeds first heat exchanger 502, where it is cooled through heat exchange with a second overhead stream from a second separator 506, exiting as stream 102 at 40° F. Cooled stream 102 feeds into first separator 504, which allows for gravity separation of the condensed water into a first bottoms 108, which is a first waste water stream for system 100. Stream 108 in this example comprises around 85% of the water in inlet feed stream 110. A first overhead vapor stream 104, which still comprises around 15% of the water from inlet feed stream 110, then feeds into a lower stage of second separator 506. It is not necessary to fully dehydrate stream 104 prior to feeding into second separator 506 to remove acid gases from methane, as almost all of the remaining water and acid gases will be substantially removed simultaneously in the second separator using methanol as an absorber. A third overhead stream 230 also feeds into a lower stage of second separator 506. At least a first portion of a fourth bottoms stream 192/148, primarily comprising methanol, feeds into an upper stage of second separator 506.

These streams are separated into a second overhead stream 114 and a second bottoms stream 112 in second separator 506. Second separator 506 is preferably an absorber column.

Second overhead stream 114 comprises around 31.145% nitrogen, 68.83% methane, 0.016% methanol, with trace amounts of $CO_2$, $H_2S$, and water and is at a temperature of around −34.3° F. and a pressure of 307.5 psia. Second overhead stream 114 passes through first heat exchanger 502 to cool feed stream 110, with stream 114 exiting as stream 106 at a temperature of around 74° F. According to one preferred embodiment, stream 106 is the treated methane stream (when the optional seventh separator 550 is not used) and is sent for nitrogen removal using systems and methods that are well known in the art. In this computer simulation example, an optional seventh separator 550 is used and stream 106 feeds into the seventh separator, where it is separated into a seventh overhead stream 242 and a seventh bottoms stream 240. Overhead stream 242 comprises 31.150% nitrogen, 68.85% methane, a trace amount of $CO_2$, and zero methanol, zero water, and zero $H_2S$. Stream 242 is the treated methane stream and is sent for nitrogen removal using systems and methods that are well known in the art. It is not necessary to further treat or pretreat either stream 106 or stream 242 to remove water or acid gases ($CO_2$ or $H_2S$) prior to nitrogen removal, as streams 106 and 242 are substantially free of these contaminants and will not encounter freezing problems in any cryogenic sections of the nitrogen removal system. Bottoms stream 240 comprises 99.27% methanol, 0.73% water, a trace amount of $H_2S$ and zero methane, zero nitrogen, and zero $CO_2$. Stream 240 may be recycled back to surge drum 542 to reuse the methanol.

A second bottoms stream 112 exits absorption column 506, comprising around 1% methane, around 0.11% nitrogen, around 11.68% $CO_2$, around 0.026% $H_2S$, around 3.28% water, and around 83.9% methanol. The methanol in column 506 absorbs most of the $CO_2$, $H_2S$, and water that was in stream 104 and exits the bottom of the column as stream 112. Stream 112 is at a temperature of around 10° F. and a pressure of around 310 psia before passing through absorber level control valve 508, exiting as stream 116 having been cooled to a temperature of around 1.2° F. and having a pressure of around 105 psia. Stream 116 then feeds into a methane stripper column 510 (a first stripper column or a third separator), preferably at an upper or top location. Methane stripper column 510 removes excess methane from the second bottoms stream so that it can be returned back to inlet gas absorber 506. This significantly reduces the amount of methane that will ultimately be present in the $CO_2/H_2S$ waste stream 160.

A third overhead stream 202 exits methane stripper column 510, preferably comprising around 21.4% methane, around 2.65% nitrogen, around 75.8% $CO_2$, and around 0.18% methanol, with trace amounts of $H_2S$ and water. Stream 202 is preferably at a temperature of around 1.2° F. before passing through methane stripper overhead heat exchanger 512 (a second heat exchanger in this preferred embodiment), exiting as stream 222 having been warmed to a temperature around 110° F. Stream 222 at a pressure of around 100 psia is then compressed in methane stripper recompressor 514 to increase the pressure to around 340 psia in exiting stream 224. Compressed stream 224 is at a temperature of around 342.6° F. Stream 224 then passes through methane compressor discharge cooler 516 (a third heat exchanger in this preferred embodiment, preferably an air cooled heat exchanger that cools the compressor discharge to near ambient temperature), exiting as stream 228 cooled to around 120° F. Stream 228 is then recycled back through the methane stripper overhead heater 512 (the second heat exchanger in this preferred embodiment), exiting as stream 230 having been further cooled to around 22.3° F. and having a pressure of around 330 psia. Stream 230 preferably feeds back into the inlet gas absorber 506 near or at a bottom stage location.

A stream 218 from a bottom of methane stripper column 510 preferably feeds into a shell side 518S of a methane stripper reboiler 518S/518T (a first reboiler) where it is partially vaporized, with stream 220 returning to a bottom of column 510 and stream 122 exiting as a third bottoms stream. Heat is supplied from a tube side of methane stripper reboiler 518T from a first portion of a fourth bottoms stream, discussed further below. Third bottoms stream 122 preferably comprises around 87.6% methanol, around 8.81% $CO_2$, and around 3.43% water, with small amounts of $H_2S$, methane and nitrogen. Stream 122 is preferably at a temperature of around 13° F. and a pressure of around 106 psia before passing through methane stripper level control valve 522. Stream 126 exits valve 522 at a slightly reduced pressure and temperature and then passes through lean/rich methanol exchanger 520 (a fifth heat exchanger in this preferred embodiment), exiting as stream 130. Stream 130 is preferably at a temperature of around 83° F. and a pressure of around 92 psia before feeding into an upper or top stage of methanol stripper column 528 (a second stripper column or a fourth separator).

A sixth overhead stream 200 (from methanol reclaimer 552), a returned bottoms stream 176 from reboiler 540, and a fifth bottoms stream 170 (from reflux accumulator 534) also feed into methanol stripper column 528 along with stream 130. A fourth overhead stream 150 from fourth separator 528 preferably comprises around 95% $CO_2$, around 3.4% methanol, around 0.27% $H_2S$, around 1.07% methane, and small amounts of water and nitrogen. Stream 150 is preferably at a temperature of around 82.7° F. before passing through stripper overhead warm reflux condenser 530 (a seventh heat exchanger in this preferred embodiment), exiting as partially condensed stream 154 preferably at a temperature of around 27.3° F. Stream 154 then passes through stripper overhead cold reflux condenser 532 (an eighth heat exchanger in this preferred embodiment), where external refrigeration is supplied to further condense the exiting stream 162 at a temperature of around −36° F. Having stream 162 at this temperature range aids in minimizing methanol loss in the acid gas vent stream 160. Stream 162 feeds into stripper reflux accumulator 534 (a fifth separator), which allows gravity separation of the condensed methanol (and remaining water) into fifth bottoms stream 166 and remaining $CO_2$ and $H_2S$ into fifth overhead stream 156. Stream 156 is preferably at a temperature of around −36.8° F. and a pressure of around 80 psia before passing through stripper back pressure control valve 536. Stream 158 exits control valve 536 at a temperature of around −49° F. and a pressure of around 24.5 psia before passing through stripper overhead warm reflux condenser 530. Stream 158 exits heat exchanger 530 as stream 160 at a temperature of around 70° F. Stream 160 is the acid gas waste stream (or waste $CO_2/H_2S$ stream). Stream 160 (still the fifth overhead stream) comprises around 98.5% $CO_2$, around 0.28% $H_2S$, around 0.041% methanol, around 1.1% methane, around 0.0016% nitrogen, and a trace amount of water. Stream 160 in this example comprises around 0.89% of the methane in inlet feed stream 110, resulting in very little loss of methane in this waste stream. Stream 160 also comprises around 99.97% of the $CO_2$ in the inlet feed stream 110 and around 100% of the $H_2S$ in the inlet feed stream 110.

A fifth bottoms stream 166 comprises around 77% methanol, around 1.15% water, around 21.57% $CO_2$, around 0.21% $H_2S$, around 0.011% methane, and a trace amount of nitrogen. Stream 166 exits fifth separator (reflux accumulator) 534 at a temperature of around −36.8° F. and 88 psia before being pumped in pump 538 to increase the pressure of exiting stream 170 to around 100 psia. Stream 170 feeds back into fourth separator 528 as a reflux stream.

A liquid stream 174 from a bottom of column 528 feeds into reboiler 540 at a temperature of around 249° F. where it is partially vaporized with vapor stream 176 returning to the bottom of column 528 and stream 178 exiting as a fourth bottoms stream from column 528. Fourth bottoms stream 178 preferably comprises around 96.2% methanol, around 3.75% water, and trace amounts of nitrogen, $CO_2$, $H_2S$, and methane. Stream 178 is at a temperature of around 249° F. Stream 178 preferably feeds into stripper surge drum 542, which holds sufficient lean methanol for several days of operation before additional methanol would need to be added. Lean methanol booster pump 544 pumps stream 184 out of surge drum 542 to increase the pressure of exiting stream 188 and provide necessary flow through to the inlet of primary methanol pump 524. Stream 188 at a temperature of around 249.9° F. and a pressure of around 165 psia is split in lean methanol splitter 546 into steams 192 (a first portion of the fourth bottoms stream) and 194 (a second portion of the fourth bottoms stream). Stream 194 feeds into a top of methanol reclaimer 552 (a sixth separator), as further described below. Stream 192 passes through lean methanol cooler 548 (a fourth heat exchanger in this preferred embodiment), exiting as stream 198 at a temperature of around 115° F. Cooler 548 is preferably an air cooled heat exchanger to reduce the temperature of the lean methanol stream 198/144 prior to final cooling in lean methanol chiller 526 (a sixth heat exchanger in this preferred embodiment).

Stream 198 passes through a lean/rich methanol heat exchanger 520, exiting as cooled stream 120 at a temperature of around 22.4° F. Stream 120 then passes through the tube side 518T of methane stripper reboiler 518S/518T, exiting as stream 132 at a temperature of around 8° F. Stream 132 is pumped in primary methanol pump 524 (the first pump), increasing the pressure of exiting stream 144 to around 315 psia. Stream 144 passes through lean methanol chiller 526 (the sixth heat exchanger in this preferred embodiment) that provides external refrigeration to stream 144, which exits chiller 526 as stream 148 at a temperature of around −36° F. Stream 148 then feeds back into a top or upper stage of absorber 506 to provide methanol to absorber column 506 to substantially separate water, $CO_2$, and $H_2S$ from methane and nitrogen in column 506.

Stream 194 (the second portion of the fourth bottoms from methanol stripper 528) feeds into a top or upper stage of sixth separator 552 (a methanol reclaimer column). A liquid stream 210 from a bottom of column 552 feeds into reboiler 554, where it is partially vaporized, with vapor stream 212 returning to column 552 and stream 214 exiting as the sixth bottoms stream. Sixth bottoms stream 214 comprises around 90% water and around 10% methanol, with no nitrogen, $CO_2$, $H_2S$, or methane, and is disposed of using appropriate methods. Sixth overhead stream 200 comprises around 97% methanol, around 3% water, and trace amounts of methane, nitrogen, $CO_2$ and $H_2S$. Stream 200 is at a temperature of around 270° F. and a pressure of around 125 psia and feeds back into a bottom or lower stage of fourth separator 528 (a methanol stripper column).

According to another preferred embodiment, system 100 further comprises a seventh separator 550 as shown in FIG. 3. Separator 550 (a molecular sieve purifier) is optional and not required for operation of system 100, but is preferred. When seventh separator 550 is used, absorber overhead stream 106 feeds into methanol purifier 550 prior to being sent for removal of nitrogen. Seventh overhead stream 242 comprises around 68.8% methane, around 31.15% nitrogen, around 0.0015% $CO_2$, and no $H_2S$, water, or methanol. Stream 242 comprises around 99.1% of the methane from feed stream 110 and around 99.99% of the nitrogen from feed stream 110. Stream 242 is also preferably substantially free of water, $CO_2$, $H_2S$, and methanol, so that no further treatment to remove water, $CO_2$, or $H_2S$ is required prior to processing stream 242 to remove nitrogen. Seventh bottoms stream 240 comprises around 99.3% methanol, around 0.73% water, a small amount of $H_2S$ and no $CO_2$, nitrogen or methane. Bottoms stream 240 may be recycled back to system 100 to reuse the methanol.

The mol % composition, flow rates, temperatures and pressures of various flow streams referred to in connection with the discussion of Example 1 appear in Table 2 below. The values for energy streams Q shown in FIGS. 1-2 for example appear in Table 3 below.

TABLE 2

FLOW STREAM PROPERTIES FOR EXAMPLE 1

| Mol Fraction % | Stream No | | | | | |
|---|---|---|---|---|---|---|
| | 110 | 102 | 104 | 106 | 108 | 112 |
| nitrogen | 20* | 20 | 20.0516 | 31.1450 | 0.00644595 | 0.113723 |
| $CO_2$ | 35* | 35 | 35.0888 | 0.00155391 | 0.607885 | 11.6847 |
| $H_2S$ | 0.1* | 0.1 | 0.100248 | 8.94719E−08 | 0.00390291 | 0.0265327 |
| Methane | 44.6* | 44.6 | 44.7151 | 68.8368 | 0.0324219 | 1.00601 |
| water | 0.3* | 0.3 | 0.0441679 | 0.000120593 | 99.3493 | 3.27894 |
| Methanol | 0* | 0 | 0 | 0.0164604 | 0 | 83.8901 |
| Temperature ° F. | 100* | 40* | 39.7881 | 74.0114 | 39.7881 | 10.0677 |
| Pressure psia | 315* | 312.5 | 310 | 305 | 310 | 310 |
| Mole Fraction Vapor % | 100 | 99.7424 | 100 | 100 | 0 | 0 |
| Molecular Weight lb/lbmol | 28.2491 | 28.2491 | 28.2751 | 19.7739 | 18.1739 | 32.8153 |
| Molar Flow lbmol/h | 1000* | 1000 | 997.424 | 642.140 | 2.57622 | 4149.46 |

TABLE 2-continued

FLOW STREAM PROPERTIES FOR EXAMPLE 1

| | | | | | | |
|---|---|---|---|---|---|---|
| Mass Flow lb/h | 28249.1 | 28249.1 | 28202.2 | 12697.6 | 46.8201 | 136166 |
| Std Vapor Volumetric Flow MMSCFD | 9.10762 | 9.10762 | 9.08415 | 5.84837 | 0.0234632 | 37.7917 |
| Std Liquid Volumetric Flow sgpm | 99.4555 | 99.4555 | 99.3616 | 61.1650 | 0.0939714 | 342.118 |

| | Stream No | | | | | |
|---|---|---|---|---|---|---|
| Mol Fraction % | 114 | 116 | 120 | 122 | 126 | 130 |
| nitrogen | 31.1450 | 0.113723 | 1.94697E−11 | 0.000147022 | 0.000147022 | 0.000147022 |
| $CO_2$ | 0.00155391 | 11.6847 | 0.000750001 | 8.81233 | 8.81233 | 8.81233 |
| $H_2S$ | 8.94719E−08 | 0.0265327 | 2.02849E−07 | 0.0251762 | 0.0251762 | 0.0251762 |
| Methane | 68.8368 | 1.00601 | 1.26249E−07 | 0.0999998 | 0.0999998 | 0.0999998 |
| water | 0.000120593 | 3.27894 | 3.75168 | 3.42562 | 3.42562 | 3.42562 |
| Methanol | 0.0164604 | 83.8901 | 96.2476 | 87.6367 | 87.6367 | 87.6367 |
| Temperature °F. | −34.2674 | 1.22404 | 22.4362 | 13.4582 | 12.4362 | 83.1846 |
| Pressure psia | 307.5 | 105* | 155 | 106 | 97 | 92* |
| Mole Fraction Vapor % | 100 | 3.93670 | 0 | 0 | 0.383100 | 5.78350 |
| Molecular Weight lb/lbmol | 19.7739 | 32.8153 | 31.5157 | 32.6005 | 32.6005 | 32.6005 |
| Molar Flow lbmol/h | 642.140 | 4149.46 | 3616.26 | 3971.68 | 3971.68 | 3971.68 |
| Mass Flow lb/h | 12697.6 | 136166 | 113969 | 129479 | 129479 | 129479 |
| Std Vapor Volumetric Flow MMSCFD | 5.84837 | 37.7917 | 32.9355 | 36.1725 | 36.1725 | 36.1725 |
| Std Liquid Volumetric Flow sgpm | 61.1650 | 342.118 | 284.987 | 323.196 | 323.196 | 323.196 |

| | Stream No | | | | | |
|---|---|---|---|---|---|---|
| Mol Fraction % | 132 | 144 | 148 | 150 | 154 | 156 |
| nitrogen | 1.94697E−11 | 0 | 0 | 0.00157446 | 0.00157446 | 0.00164648 |
| $CO_2$ | 0.000750001 | 0.000723625 | 0.000723625 | 95.1862 | 95.1862 | 98.5553 |
| $H_2S$ | 2.02849E−07 | 1.87008E−07 | 1.87008E−07 | 0.278477 | 0.278477 | 0.282673 |
| Methane | 1.26249E−07 | 1.18036E−07 | 1.18036E−07 | 1.07002 | 1.07002 | 1.11858 |
| water | 3.75168 | 3.75000 | 3.75000 | 0.0504186 | 0.0504186 | 0.000201693 |
| Methanol | 96.2476 | 96.2493 | 96.2493 | 3.41326 | 3.41326 | 0.0415744 |
| Temperature °F. | 8.07061 | 12.2460 | −36* | 82.7210 | 27.3454 | −36.8159 |
| Pressure psia | 150 | 315* | 310 | 90 | 85 | 80 |
| Mole Fraction Vapor % | 0 | 0 | 0 | 100 | 96.9465 | 100 |
| Molecular Weight lb/lbmol | 31.5157 | 31.5159 | 31.5159 | 43.2608 | 43.2608 | 43.6633 |
| Molar Flow lbmol/h | 3616.26 | 3616.40 | 3616.40 | 371.342 | 371.342 | 355.059 |
| Mass Flow lb/h | 113969 | 113974 | 113974 | 16064.5 | 16064.5 | 15503.0 |
| Std Vapor Volumetric Flow MMSCFD | 32.9355 | 32.9368 | 32.9368 | 3.38204 | 3.38204 | 3.23374 |
| Std Liquid Volumetric Flow sgpm | 284.987 | 285 | 285 | 39.5952 | 39.5952 | 38.1968 |

| | Stream No | | | | | |
|---|---|---|---|---|---|---|
| Mol Fraction % | 158 | 160 | 162 | 166 | 170 | 174 |
| nitrogen | 0.00164648 | 0.00164648 | 0.00157446 | 3.75877E−06 | 3.75877E−06 | 1.87026E−09 |
| $CO_2$ | 98.5553 | 98.5553 | 95.1862 | 21.5272 | 21.5272 | 0.0114102 |
| $H_2S$ | 0.282673 | 0.282673 | 0.278477 | 0.209932 | 0.209932 | 1.06472E−06 |
| Methane | 1.11858 | 1.11858 | 1.07002 | 0.0109413 | 0.0109413 | 5.51110E−06 |
| water | 0.000201693 | 0.000201693 | 0.0504186 | 1.14797 | 1.14797 | 3.40108 |
| Methanol | 0.0415744 | 0.0415744 | 3.41326 | 77.1039 | 77.1039 | 96.5875 |
| Temperature °F. | −49.2842 | 70* | −36* | −36.8159 | −36.7487 | 249.232 |
| Pressure psia | 24.5 | 19.5* | 82.5 | 80 | 100 | 92 |
| Mole Fraction Vapor % | 100 | 100 | 95.6003 | 0 | 0 | 0 |

TABLE 2-continued

FLOW STREAM PROPERTIES FOR EXAMPLE 1

| | | | | | | |
|---|---|---|---|---|---|---|
| Molecular Weight lb/lbmol | 43.6633 | 43.6633 | 43.2608 | 34.4597 | 34.4597 | 31.5662 |
| Molar Flow lbmol/h | 355.059 | 355.059 | 371.342 | 16.2480 | 16.2480 | 4657.78 |
| Mass Flow lb/h | 15503.0 | 15503.0 | 16064.5 | 559.901 | 559.901 | 147028 |
| Std Vapor Volumetric Flow MMSCFD | 3.23374 | 3.23374 | 3.38204 | 0.147981 | 0.147981 | 42.4213 |
| Std Liquid Volumetric Flow sgpm | 38.1968 | 38.1968 | 39.5952 | 1.39457 | 1.39457 | 367.805 |

| | Stream No | | | | | |
|---|---|---|---|---|---|---|
| Mol Fraction % | 176 | 178 | 184 | 188 | 192 | 194 |
| nitrogen | 8.71447E-09 | 1.94697E-11 | 1.94697E-11 | 1.94697E-11 | 1.94697E-11 | 1.94697E-11 |
| $CO_2$ | 0.0508317 | 0.000750001 | 0.000750001 | 0.000750001 | 0.000750001 | 0.000750001 |
| $H_2S$ | 4.25190E-06 | 2.02849E-07 | 2.02849E-07 | 2.02849E-07 | 2.02849E-07 | 2.02849E-07 |
| Methane | 2.54243E-05 | 1.26249E-07 | 1.26249E-07 | 1.26249E-07 | 1.26249E-07 | 1.26249E-07 |
| water | 2.10458 | 3.75168 | 3.75168 | 3.75168 | 3.75168 | 3.75168 |
| Methanol | 97.8446 | 96.2476 | 96.2476 | 96.2476 | 96.2476 | 96.2476 |
| Temperature ° F. | 249.382 | 249.382 | 249.382 | 249.907 | 249.907 | 249.907 |
| Pressure psia | 92 | 92 | 92 | 165* | 165 | 165 |
| Mole Fraction Vapor % | 100 | 0 | 0 | 0 | 0 | 0 |
| Molecular Weight lb/lbmol | 31.7527 | 31.5157 | 31.5157 | 31.5157 | 31.5157 | 31.5157 |
| Molar Flow lbmol/h | 991.439 | 3666.34 | 3666.34 | 3666.34 | 3616.26 | 50.0748* |
| Mass Flow lb/h | 31480.9 | 115547 | 115547 | 115547 | 113969 | 1578.14 |
| Std Vapor Volumetric Flow MMSCFD | 9.02965 | 33.3916 | 33.3916 | 33.3916 | 32.9355 | 0.456062 |
| Std Liquid Volumetric Flow sgpm | 78.8719 | 288.933 | 288.933 | 288.933 | 284.987 | 3.94624 |

| | Stream No | | | | | |
|---|---|---|---|---|---|---|
| Mol Fraction % | 198 | 200 | 202 | 210 | 212 | 214 |
| nitrogen | 1.94697E-11 | 1.96370E-11 | 2.65105 | 0 | 0 | 0 |
| $CO_2$ | 0.000750001 | 0.000756448 | 75.8548 | 0 | 0 | 0 |
| $H_2S$ | 2.02849E-07 | 2.04593E-07 | 0.0568379 | 0 | 0 | 0 |
| Methane | 1.26249E-07 | 1.27335E-07 | 21.2467 | 0 | 0 | 0 |
| water | 3.75168 | 3.01025 | 0.00211067 | 71.8089 | 71.6362 | 89.9998 |
| Methanol | 96.2476 | 96.9890 | 0.188548 | 28.1911 | 28.3638 | 10.0002 |
| Temperature ° F. | 115* | 270.470 | 1.22778 | 305.488 | 327.550 | 327.550 |
| Pressure psia | 160 | 125 | 105 | 127 | 127 | 127 |
| Mole Fraction Vapor % | 0 | 100 | 100 | 0 | 100 | 0 |
| Molecular Weight lb/lbmol | 31.5157 | 31.6197 | 37.6146 | 21.9695 | 21.9938 | 19.4180 |
| Molar Flow lbmol/h | 3616.26 | 49.6480 | 177.780 | 45.3812 | 44.9544 | 0.426799 |
| Mass Flow lb/h | 113969 | 1569.85 | 6687.12 | 997.004 | 988.716 | 8.28757 |
| Std Vapor Volumetric Flow MMSCFD | 32.9355 | 0.452175 | 1.61915 | 0.413315 | 0.409428 | 0.00388712 |
| Std Liquid Volumetric Flow sgpm | 284.987 | 3.92897 | 18.9213 | 2.20316 | 2.18589 | 0.0172683 |

| | Stream No | | | | | |
|---|---|---|---|---|---|---|
| Mol Fraction % | 218 | 220 | 222 | 224 | 228 | 230 |
| nitrogen | 0.000626249 | 0.0714098 | 2.65105 | 2.65105 | 2.65105 | 2.65105 |
| $CO_2$ | 9.34009 | 87.2934 | 75.8548 | 75.8548 | 75.8548 | 75.8548 |
| $H_2S$ | 0.0254632 | 0.0678563 | 0.0568379 | 0.0568379 | 0.0568379 | 0.0568379 |
| Methane | 0.181784 | 12.2616 | 21.2467 | 21.2467 | 21.2467 | 21.2467 |
| water | 3.40261 | 0.00361971 | 0.00211067 | 0.00211067 | 0.00211067 | 0.00211067 |
| Methanol | 87.0494 | 0.302034 | 0.188548 | 0.188548 | 0.188548 | 0.188548 |
| Temperature ° F. | 2.21029 | 13.4582 | 110 | 342.588 | 120* | 22.2759 |

TABLE 2-continued

FLOW STREAM PROPERTIES FOR EXAMPLE 1

| | | | | | | |
|---|---|---|---|---|---|---|
| Pressure psia | 106 | 106 | 100 | 340* | 335 | 330 |
| Mole Fraction Vapor % | 0 | 100 | 100 | 100 | 100 | 99.9634 |
| Molecular Weight lb/lbmol | 32.6538 | 40.5250 | 37.6146 | 37.6146 | 37.6146 | 37.6146 |
| Molar Flow lbmol/h | 3998.57 | 26.8895 | 177.780 | 177.780 | 177.780 | 177.780 |
| Mass Flow lb/h | 130568 | 1089.70 | 6687.12 | 6687.12 | 6687.12 | 6687.12 |
| Std Vapor Volumetric Flow MMSCFD | 36.4174 | 0.244899 | 1.61915 | 1.61915 | 1.61915 | 1.61915 |
| Std Liquid Volumetric Flow sgpm | 326.086 | 2.88921 | 18.9213 | 18.9213 | 18.9213 | 18.9213 |

| | Stream No | |
|---|---|---|
| Mol Fraction % | 240 | 242 |
| nitrogen | 0 | 31.1502 |
| $CO_2$ | 0 | 0.00155416 |
| $H_2S$ | 0.000539602 | 0 |
| Methane | 0 | 68.8482 |
| water | 0.727292 | 0 |
| Methanol | 99.2722 | 0 |
| Temperature ° F. | 74.0114 | 74.0114 |
| Pressure psia | 305 | 305 |
| Mole Fraction Vapor % | 0 | 100 |
| Molecular Weight lb/lbmol | 31.9399 | 19.7719 |
| Molar Flow lbmol/h | 0.106474 | 642.034 |
| Mass Flow lb/h | 3.40076 | 12694.2 |
| Std Vapor Volumetric Flow MMSCFD | 0.000969724 | 5.84740 |
| Std Liquid Volumetric Flow sgpm | 0.00853404 | 61.1565 |

TABLE 3

ENERGY STREAM VALUES FOR EXAMPLE 1

| Energy Stream | Energy Rate Btu/hr | Power hp | From Block | To Block |
|---|---|---|---|---|
| Q-1 | | 22.0535 | — | 544 |
| Q-2 | 53.8326 | 0.0212 | — | 538 |
| Q-3 | 270287 | | 532 | — |
| Q-4 | 1.13949E+07 | | 548 | — |
| Q-5 | 1.05958E+06 | | 518T | 518S |
| Q-6 | 1.39050E+07 | | — | 540 |
| Q-7 | | 150.400 | — | 514 |
| Q-8 | 3.54917E+06 | | 526 | — |
| Q-9 | 405192 | | 516 | — |
| Q-10 | | 39.6964 | — | 524 |
| Q-11 | 703802 | | — | 554 |

Those of ordinary skill in the art will understand that the values indicated above for Example 1 are dependent on the composition and operating parameters described in connection with Example 1 and the feed stream 110 in Example 1 and that the values will vary if the feed composition and operating parameters are changed.

As used herein stream is "substantially free" of a component (such as water, $CO_2$, $H_2S$, or methane) when the stream comprises less than 0.2%, more preferably less than 0.1% of the component. For example, based on the computer model results described above, the second overhead stream (e.g. stream 114) is substantially free of water, $CO_2$, $H_2S$, and methanol as it comprises significantly less than 0.2% of these components. As used herein, one or more components are "substantially removed" or "substantially separated" from one or more other components in a separator when one of the streams exiting the separator (an overhead stream or a bottoms stream) contains the a majority of the removed/separated component, most preferably at least 99% of the removed/separated component. For example, water and acid gases are simultaneously substantially separated from methane in the absorber column 506 because bottoms stream 112 comprises more than 99% of the water, $CO_2$, and $H_2S$ feeding into column 506 through column feed streams 104, 230, and 148.

As used herein a stream "primarily" or "substantially" comprises a component when the component has the highest mol % compared to other components in the stream (e.g. a stream comprising 60% methane, 30% nitrogen, and 10% $CO_2$ would primarily comprise methane). As used herein, percentages refer to mol %.

The specific operating parameters described herein with Example 1 are based on the specific computer modeling and feed stream parameters set forth above. These parameters and the various composition, pressure, and temperature values described above will vary depending on the feed stream parameters as will be understood by those of ordinary skill in the art. Any amount described herein as a range includes any individual amount within that range and any subrange within that range, including any subrange that overlaps from one preferred range or subrange to another preferred subrange. Any equipment or method step described herein with respect to one preferred embodiment may be used with any other preferred embodiment even if not specifically described with that preferred embodiment. Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventor is legally entitled.

I claim:

1. A system for producing a treated methane stream from a feed stream comprising methane, water, and one or more acid gases, the system comprising:
    a series of separators to produce the treated methane stream, one or more waste water streams, and an acid gas waste stream, the series of separators comprising: (1) an absorber column for separating an absorber feed stream and a first stripper overhead stream using a methanol stream as an absorber into an absorber overhead stream and an absorber bottoms stream, and (2) a first stripper column for separating the absorber bottoms stream into the first stripper overhead stream and a first stripper bottoms stream, the first stripper column comprising a reboiler;
    wherein the absorber overhead stream is the treated methane stream and is substantially free of the water and the one or more acid gases and comprises at least 98% of the methane from the feed stream; and
    wherein the one or more acid gases comprise $CO_2$, $H_2S$, or both.

2. The system of claim 1 wherein the feed stream is not dehydrated prior to feeding into the series of separators.

3. The system of claim 1 wherein no portion of the feed stream is dehydrated by absorption or adsorption prior to feeding into the absorber column.

4. The system of claim 1 wherein the water and the one or more acid gases from the feed stream that are contained in the absorber feed stream are simultaneously substantially separated in the absorber column from the methane from the feed stream that is contained in the absorber feed stream.

5. The system of claim 1 wherein the acid gas waste stream is substantially free of the methane.

6. The system of claim 1 wherein the acid gas waste stream comprises less than 1% of the methane from the feed stream.

7. The system of claim 1 wherein the feed stream further comprises nitrogen;
    wherein the treated methane stream further comprises most of the nitrogen from the feed stream and is sent for further processing for nitrogen removal from the methane; and
    wherein the treated methane stream is not processed to further remove any remaining portion of the water or the one or more acid gases prior to being processed for nitrogen removal.

8. The system of claim 1 further comprising:
    a first heat exchanger to cool the feed stream through heat exchange with a second overhead stream to at least partially condense the water in the feed stream; and
    wherein the series of separators further comprises a first separator downstream of the first heat exchanger to separate the cooled feed stream into a first overhead stream and a first bottoms stream;
    wherein the first bottoms stream is a first of the waste water streams.

9. The system of claim 1 wherein no amine treatment is used to remove the one or more acid gases from the feed stream.

10. The system of claim 9 wherein no membranes are used to remove the water or the one or more acid gases from the feed stream.

11. The system of claim 1 wherein the feed stream is a landfill gas stream that contains less than 1% of hydrocarbons heavier than methane.

12. The system of claim 1 wherein the acid gas waste stream comprises at least 99% of the $CO_2$ from the feed stream, at least 99% of the $H_2S$ from the feed stream, less than 1% of the methane from the feed stream, and less than 1% of the water from the feed stream.

13. The system of claim 1 wherein the treated methane stream comprises at least 99% of the methane from the feed stream.

14. A method for producing the treated methane stream using the system of claim 1, the method comprising:
    removing the water and the one or more acid gases from the feed stream by separating components of the feed stream in the series of separators comprising the absorber column to produce the treated methane stream, the one or more waste water streams, and the acid gas waste stream;
    supplying an absorber stream primarily comprising methanol to the absorber column;
    wherein the treated methane stream comprises at least 99% of the methane from the feed stream and is substantially free of the water and the one or more acid gases from the feed stream; and
    wherein the one or more acid gases comprise $CO_2$, $H_2S$, or both.

15. The method of claim 14 wherein the feed stream is not dehydrated by absorption or adsorption prior to separating the one or more acid gases in the removing step.

16. The method of claim 14 wherein no streams are dehydrated prior to feeding into the absorber column.

17. The method of claim 14 wherein the water and the one or more acid gases from the feed stream that are contained in the absorber feed stream are simultaneously substantially separated in the absorber column from the methane from the feed stream that is contained in the absorber feed stream.

18. The method of claim 14 wherein the acid gas waste stream is substantially free of methane.

19. The method of claim 14 wherein the acid gas waste stream comprises less than 1% of the methane from the feed stream.

20. The method of claim 14 wherein the feed stream further comprises nitrogen;
    wherein the treated methane stream further comprises at least 99% of the nitrogen from the feed stream; and
    wherein the treated methane stream is not processed to further remove any remaining portion of the water or of the one or more acid gases prior to being processed for nitrogen removal.

21. The method of claim 14 further comprising:
    cooling the feed stream in a first heat exchanger through heat exchange with a second overhead stream to at least partially condense the water in the feed stream; and
    wherein the removing step comprises separating the cooled feed stream in a first separator downstream of the first heat exchanger into a first overhead stream and a first bottoms stream;

wherein the first bottoms stream is a first of the waste water streams; and wherein the first overhead stream comprises around 10 to 25% of the water from the feed stream.

22. The method of claim 21 wherein the first bottoms stream comprises at least 99% water and less than 1% of methane, less than 1% of $CO_2$, and less than 1% of $H_2S$.

23. The method of claim 21 further comprising:

splitting a fourth bottoms stream into a first portion and a second portion; and wherein the removing step further comprises: (1) separating the first overhead stream, a third overhead stream, and at least the first portion of a fourth bottoms stream comprising methanol in a second separator into the second overhead stream and a second bottoms stream, (2) separating the second bottoms stream in a third separator into the third overhead stream and a third bottoms stream, (3) separating the third bottoms stream, a fifth bottoms stream, and a sixth overhead stream in a fourth separator into a fourth overhead stream and a fourth bottoms stream, (4) separating the fourth overhead stream into a fifth overhead stream and the fifth bottoms stream in a fifth separator, and (5) separating the second portion of the fourth bottoms stream in a sixth separator into the sixth overhead stream and a sixth bottoms stream;

wherein the second separator is the absorber column;

wherein the fifth overhead stream is the acid gas waste stream;

wherein the second overhead stream is the treated methane stream; and wherein the sixth bottoms streams is a second of the waste water streams.

24. The method of claim 23 further comprising:

warming the third overhead stream in a second heat exchanger;

compressing the third overhead stream downstream of the second heat exchanger;

cooling the third overhead stream in a third heat exchanger downstream of the compression step to form a recycled third overhead stream; and recycling the recycled third overhead stream through the second heat exchanger downstream of the third heat exchanger to further cool the recycled third overhead stream; and wherein the recycled third overhead stream feeds into the second separator downstream of the second heat exchanger.

25. A system for producing a treated methane stream from a feed stream comprising methane, water, and one or more acid gases, the system comprising:

a first heat exchanger to cool the feed stream through heat exchange with a second overhead stream to at least partially condense the water in the feed stream; and a series of separators configured to produce the treated methane stream, one or more waste water streams, and an acid gas waste stream, the series of separators comprising: (1) a first separator downstream of the first heat exchanger to separate the cooled feed stream into a first overhead stream and a first bottoms stream; (2) an absorber column for separating the first overhead stream, a third overhead stream, and at least a first portion of a fourth bottoms stream comprising methanol into the second overhead stream and a second bottoms stream; (3) a third separator for separating the second bottoms stream into the third overhead stream and a third bottoms stream; (4) a fourth separator for separating the third bottoms stream, a fifth bottoms stream, and a sixth overhead stream into a fourth overhead stream and the fourth bottoms stream; (5) a fifth separator for separating the fourth overhead stream into the fifth overhead stream and the fifth bottoms stream; and (6) a sixth separator for separating a second portion of the fourth bottoms stream into the sixth overhead stream and a sixth bottoms stream; and a splitter for splitting the fourth bottoms stream into the first portion and the second portion;

wherein the one or more acid gases comprise $CO_2$, $H_2S$, or both;

wherein the first bottoms stream is a first of the waste water streams;

wherein the fifth overhead stream is the acid gas waste stream;

wherein the second overhead stream is the treated methane stream and is substantially free of the water and the one or more acid gases; and wherein the sixth bottoms streams is a second of the waste water streams.

26. The system of claim 25 further comprising:

a second heat exchanger for warming the third overhead stream through heat exchange with a recycled third overheas stream;

a compressor for compressing the third overhead stream downstream of the second heat exchanger;

a third heat exchanger for cooling the third overhead stream downstream of the compressor to form the recycled third overhead stream; and wherein the recycled third overhead stream passes through the second heat exchanger downstream of the third heat exchanger to cool the recycled third overhead stream; and wherein the recycled third overhead stream feeds into the second separator downstream of the second heat exchanger.

27. The system of claim 26 wherein the third heat exchanger is an air cooler.

28. The system of claim 26 further comprising:

a series of heat exchangers for cooling the first portion of the fourth bottoms stream prior to feeding into the second separator; and wherein the first portion of the fourth bottoms stream is at a temperature of around −30 to −40° F. when it feeds into the second separator.

29. The system of claim 28 wherein the series of heat exchangers comprises:

a fourth heat exchanger comprising an air cooler;

a fifth heat exchanger downstream of the fourth heat exchanger, wherein the first portion of the fourth bottoms stream is cooled through heat exchange with the third bottoms stream;

a first reboiler for the third separator, wherein the first portion of the fourth bottoms stream passes through the first reboiler after passing through the fifth heat exchanger; and a sixth heat exchanger downstream of the first reboiler, wherein the first portion of the fourth bottoms stream is cooled with an external refrigerant.

30. The system of claim 29 further comprising a first pump for pumping the first portion of the fourth bottoms stream to increase the pressure to around 300 to 320 psia prior to feeding into the second separator.

31. The system of claim 30 further comprising a second pump for pumping at least the first portion of the fourth bottoms stream upstream of the series of heat exchangers.

32. The system of claim 29 further comprising:
a seventh heat exchanger for cooling the fourth overhead stream through heat exchange with the fifth overhead stream;
an eighth heat exchanger for cooling the fourth overhead stream with an external refrigerant, wherein the eighth heat exchanger is downstream of the seventh heat exchanger and upstream of the fourth overhead stream feeding into the fifth separator; and
a pump for pumping the fifth bottoms stream to increase the pressure to around 90 to 110 psia prior to feeding into the fourth separator as a reflux stream.

33. The system of claim 25 further comprising:
a first control valve for maintaining a liquid level in the second separator at a desired level; and
a second control valve for maintaining a liquid level in the third separator at a desired level.

34. The system of claim 33 further comprising a third control valve for maintaining a pressure in the fourth separator between around 70 to 90 psia.

35. The system of claim 25 further comprising:
a seventh separator for separating the second overhead stream into a seventh overhead stream and seventh bottoms stream;
wherein the seventh overhead stream is a final treated methane stream comprising at least 99% of the methane from the feed stream, less than 0.1% of the water from the feed stream, and less than 0.1% total of the one or more acid gases from the feed stream; and
wherein the seventh bottoms stream comprises at least 99% methanol and is recycled for use as an absorber in the second separator.

36. The system of claim 25 wherein the first bottoms stream and the sixth bottoms stream together comprise at least 99% of the water from the feed stream.

37. The system of claim 25 wherein the first overhead stream comprises around 10 to 25% of the water from the feed stream.

* * * * *